United States Patent [19]

Heinzelmann et al.

[11] Patent Number: 5,228,544
[45] Date of Patent: Jul. 20, 1993

[54] DEVICE FOR REDUCING THE IDLING LOSSES IN HYDRODYNAMIC BRAKES

[75] Inventors: Karl-Fritz Heinzelmann, Meckenbeuren; Harald Eckert, Langenargen; Hans-Jürgen Oexl, Konstanz, all of Fed. Rep. of Germany

[73] Assignee: Zahnradfabrik Friedrichshafen AG, Fed. Rep. of Germany

[21] Appl. No.: 835,938
[22] PCT Filed: Sep. 5, 1990
[86] PCT No.: PCT/EP90/01486
§ 371 Date: Feb. 14, 1992
§ 102(e) Date: Feb. 14, 1992
[87] PCT Pub. No.: WO91/03661
PCT Pub. Date: Mar. 21, 1991

[30] Foreign Application Priority Data

Sep. 8, 1989 [DE] Fed. Rep. of Germany ....... 3929978

[51] Int. Cl.⁵ .................. F16D 57/04; B60T 1/087; B60T 10/02
[52] U.S. Cl. ........................... 188/296; 188/290
[58] Field of Search .......... 188/290, 291, 292, 293, 188/294, 295, 296, 264 E; 60/330; 192/3.23, 4 B

[56] References Cited

U.S. PATENT DOCUMENTS

| | | |
|---|---|---|
| 3,091,980 | 6/0463 | Black . |
| 4,043,434 | 8/1977 | Braschler ............. 188/296 |
| 4,982,819 | 1/1991 | Koshimo ............. 188/296 |

FOREIGN PATENT DOCUMENTS

| | | |
|---|---|---|
| 1209145 | 1/1966 | Fed. Rep. of Germany . |
| 2209446 | 9/1973 | Fed. Rep. of Germany . |
| 2509005 | 9/1976 | Fed. Rep. of Germany . |
| 2605229 | 10/1976 | Fed. Rep. of Germany . |
| 2716126 | 10/1977 | Fed. Rep. of Germany . |
| 3207634 | 10/1982 | Fed. Rep. of Germany . |
| 1138622 | 1/1969 | United Kingdom . |

*Primary Examiner*—Douglas C. Butler
*Attorney, Agent, or Firm*—Davis, Bujold & Streck

[57] ABSTRACT

In a hydrodynamic brake (1), in order to reduce the ventilation losses, adjustable baffles (2, 20) are situated between a rotor (3) and a stator (4). During idling, when oil has been evacuated from the brake (1), one or more baffles (2, 20) of angular cross section in the outer area of the toroidal chambers (31, 41) separate the chambers via a radially inward projecting annular leg (21), a leg cylindrically situated in an axial direction abutting against the inner wall (52) of a chamber (5). During operation of the brake, that is, when the hydrodynamic brake (1) is filled with oil, the radially inward projecting leg (21) is located with its front edge (29) behind the toroidal chambers (31, 41). When only one baffle (20) covering the entire periphery of the outer area of the toroidal chambers (31, 41) is installed, slits (23, 28) are disposed in the radially inward projecting annular leg (21) to obtain the adequate elasticity. The actuation in the radially outward and inward end positions is obtained via an actuation device (6, 60), a specially advantageous design being a piston-cylinder unit (60) having two pistons (61) and a driver device on the pistons and drivers on the baffle (20), the inner position being obtained via springs (62) and the outer position via the pressure of a pressurized fluid in a pressure chamber (63) located between both pistons (61).

11 Claims, 3 Drawing Sheets

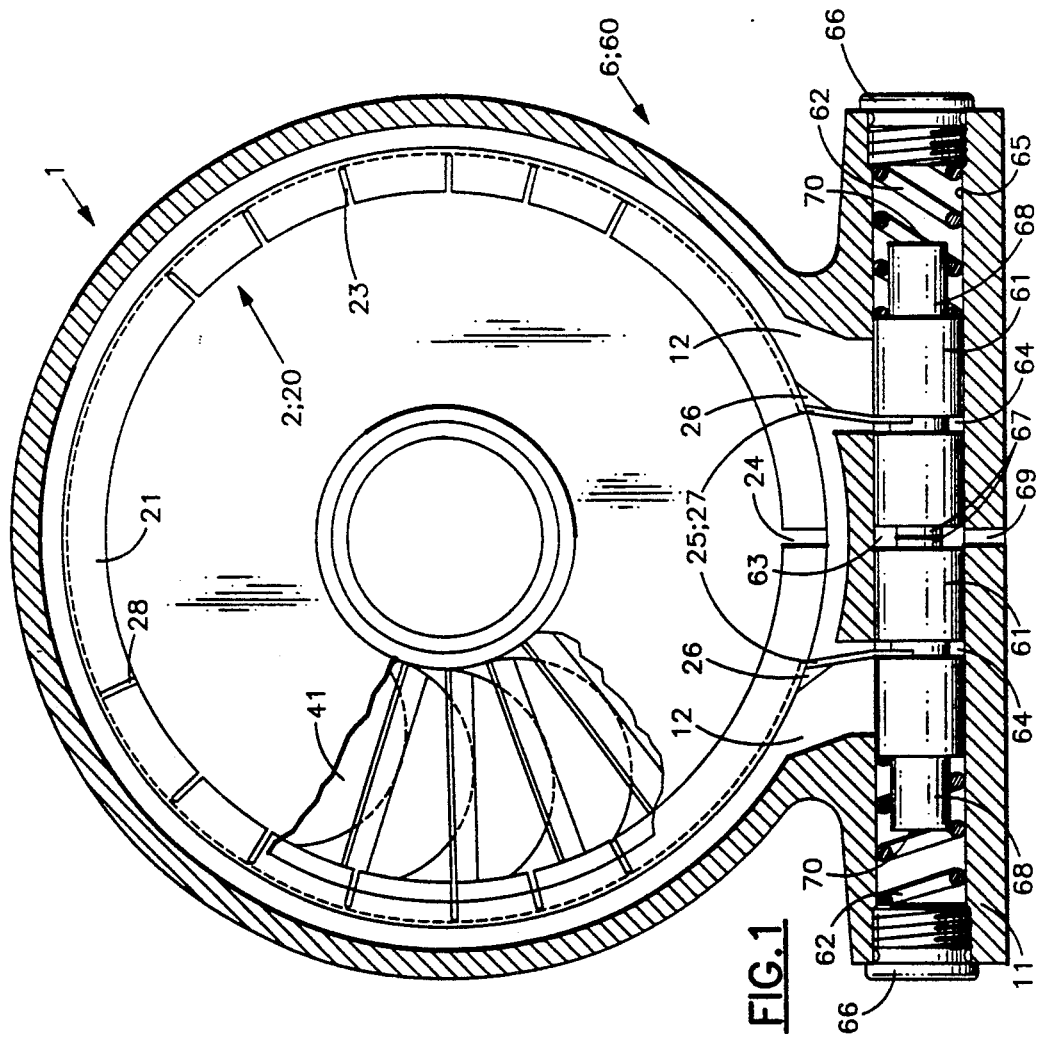

5,228,544

DEVICE FOR REDUCING THE IDLING LOSSES IN HYDRODYNAMIC BRAKES

The invention concerns a hydrodynamic brake (retarder) in which, in order to reduce ventilation losses, adjustable baffles are situated between a rotor and a stator which in an idle operation, when oil has been evacuated from the brake, act, in the area of the outer diameter of both toroidal chambers, as annular partitions reducing the common toroidal chamber from radially outward, and during operation of the brake when the brake is filled with oil are drawn back to the outer toroidal contour or behind it.

German patent 26 05 229 has disclosed such a device for preventing ventilation losses when the brake is not filled. In said publication, an elastically spring-loaded ring of substantially rectangular cross section is described which during operation of the brake is drawn back behind the toroidal contour and in an idle operation projects into the clearance between stator torus and rotor torus. The actuation in a radially outward and radially inward end position is effected via an elbow lever arrangement actuated by a load piston. Although said device is of relatively simple construction, it has not become accepted, since the width of the elastically spring-loaded ring is limited and thus the losses in the idle operation are not sufficiently reduced.

Therefore, the problem to be solved by the invention is to develop a device in a manner such that, with a simple construction of the device, the flow cross section between rotor and stator is more strongly interrupted and it is possible to further reduce the flow losses.

This problem is solved by the characteristic features of the instant invention. For instance, by angular baffles arranged on the entire periphery of the toroidal chambers, it is possible to design in a radial direction the annular legs projecting radially outward into the toroidal chamber so that the common toroidal chamber remaining is greatly reduced. The construction of the baffles, such as angular, ensures a good control and precise strokes in the radially outward and radially inward end positions. At the same time, the actuation devices, when several baffles are distributed on the periphery, can be situated therebetween directly in a peripheral space or parallel to a peripheral space.

If only one baffle, extending over the entire periphery with a peripheral space, is disposed, the elasticity between the outer and inner end positions is obtained via slits which are limited to the annular radially extending leg of the baffle. It is possible to evenly distribute said slits over the entire periphery. But it is also conceivable, in the area of the peripheral spaces and opposite thereto, to omit a few slits to obtain in said area an effective annular rigidity. The construction of the slits can be optimized so that in the radially outward position up to a small peripheral space on the open ring, the latter can also be closed. Since the radially inward projecting leg of the baffle is located behind the toroidal chamber in the radially outward end position, the slits do not act negatively in said position. It is specially advantageous when installing only one baffle that, except for the peripheral space, it extends over the entire periphery of the flow brake. The installation of the actuation device in the area of the peripheral space in the form of a piston-cylinder unit is also advantageous. A particularly simple construction results when both ends of the open angular baffle, for instance, are each connected with one piston via a driver and a driver device in the piston, there being obtained in a simple manner the central position of the pistons via springs and their outer end positions obtained via a filled pressure chamber situated between the pistons. By this simple arrangement, the reduction of the losses in the radially inward position is obtained by the inner position of the pistons produced by the springs, while the inactive position for reducing idle losses, associated with the radially outward position of the baffle, is obtained by the pressure of the pressure chamber which moves the pistons outwardly against the pressure of a spring.

The invention is not limited to the combination of features of the claims. Other logical possible combinations result for the expert from the claims and separate features of the claims depending on the existing problem.

Other details of the invention are explained with reference to the drawings and the embodiments. In the drawings:

FIG. 1 shows a section through a hydrodynamic brake with a one piece baffle and an actuation device therefor in an active position;

FIG. 2 shows a cross section according to FIG. 1;

Figure 3:
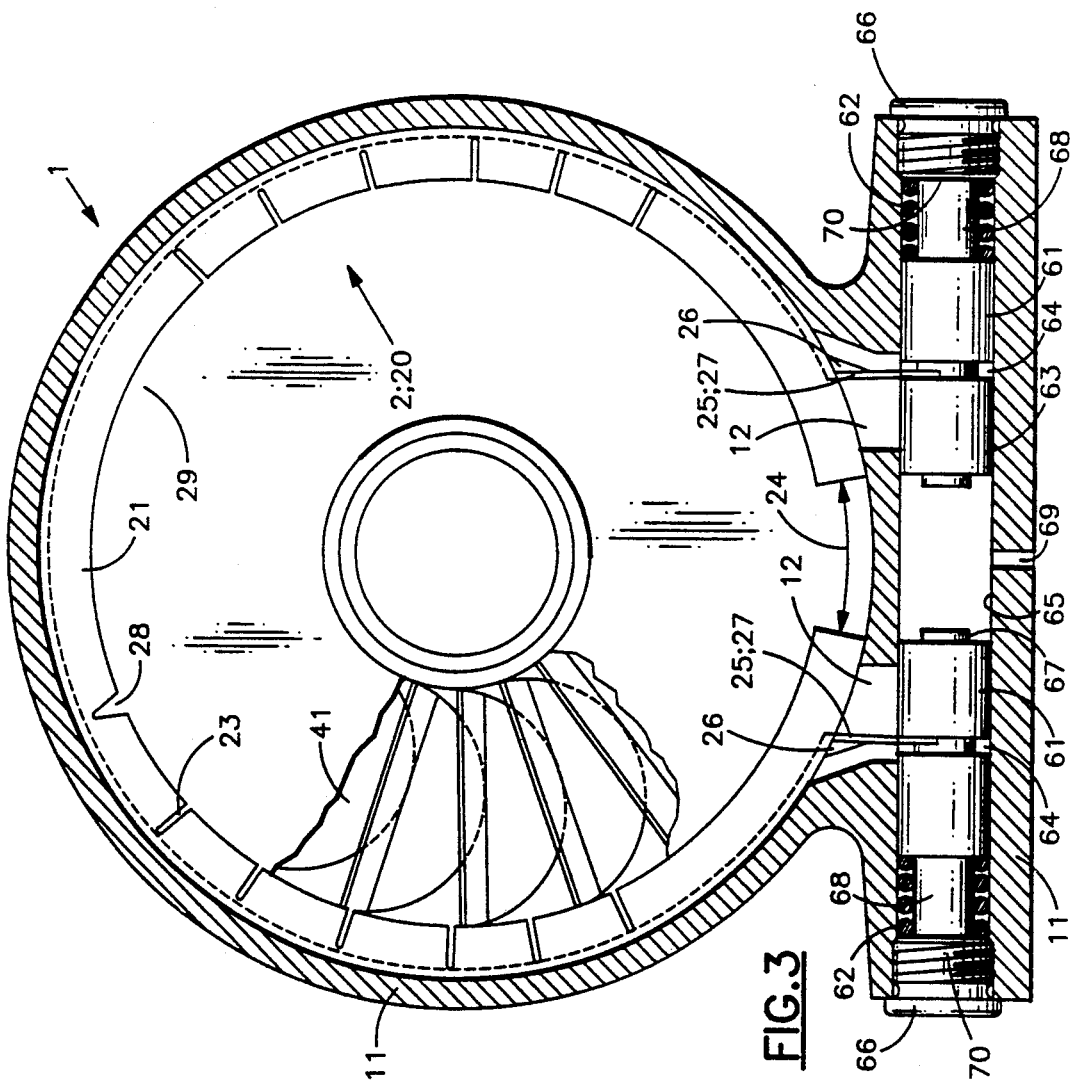
FIG. 3 shows a section according to FIG. 1 with the sunk baffle in the braking position.

The hydrodynamic brake—retarder—is shown cut in FIG. 1 so as to make visible the stator toroidal chamber 41 with the baffle 2, 20. The baffle 20 is made of one piece and covers, except for the peripheral space 24, the entire outer area of the toroidal chamber in the active position in which the idle losses of the hydrodynamic brake are reduced in the phase where the brake is not filled with oil. Together with the design of the baffle 20 as one piece, solutions with divided baffles are also conceivable such as two or three segments, which are respectively provided with or connected to actuation devices. In FIG. 1, an annular leg 21 of the one-piece design of the baffle extending in a radial direction projects into the toroidal chamber, the elasticity of said annular leg 21 being obtained by slits 23. Said slits can be evenly distributed about the periphery, it being also possible to make the slits unnecessary in the area of the peripheral space 24 and radially opposite in a more or less large area. No slits should be made between the driver 25 and the peripheral space 24. The housing 11 of the hydrodynamic brake 1 is foot-like and enlarged on a peripheral side of the hydrodynamic brake to accommodate a bore 65 for the piston-cylinder unit 60. In the latter, two pistons 61 are lodged which are pressed into a central position via springs 62. The springs are supported via locking screws 66. As a consequence of the protrusions 67 on the piston 61 or a stop 71 (FIG. 5) situated in the center of the bore, an annular space 63 results between said two pistons which acts as a pressure chamber and is connected via the duct 69 with a source of pressurized fluid. The pistons also have a long protrusion 68 toward the exterior on which the springs 62 are lodged. The stroke of the pistons, actuated via pressurized fluid on the locking screws 66, is limited via the stops 70. Approximately in the central area of the longitudinal extension of the piston, a driver device 64 is added in the form of an annular recess in which engages the drivers 25 of the one-piece baffle. The driver 25 is shaped in this embodiment as a bent leg 27 of the axially extending cylindrical leg 22, a reinforcement 26 ensures the stability of the shape of said bent leg 27 toward the baffle 20. The whole housing 11 of the hydrodynamic brake 1, with the actuation device 6 (piston-cylinder unit 60), has an aperture 12 so that free mobility of the driver 25 is ensured both in the inner position (FIG. 1) and in the outer position (FIG. 3).

Figure 4:
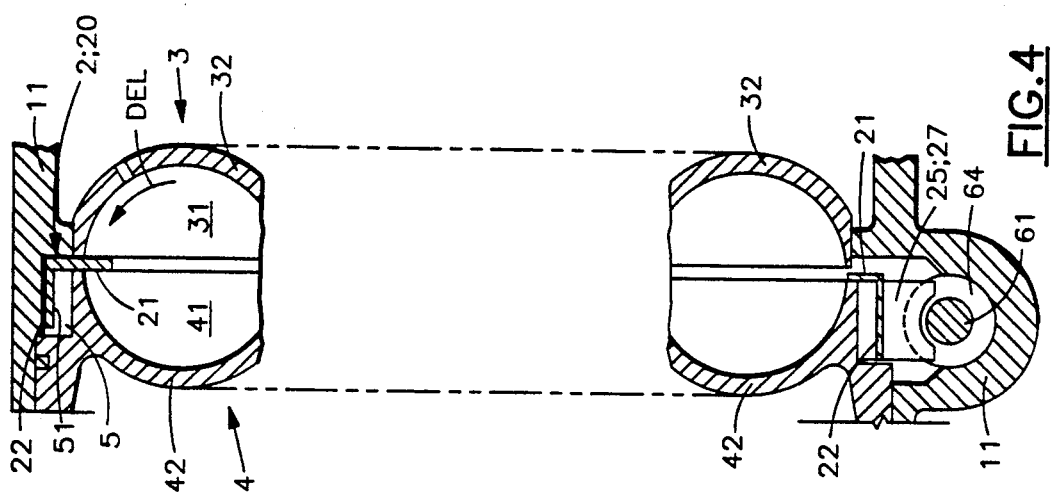
FIG. 4 shows a cross section according to FIG. 3.

In the cross section of FIG. 2, the housing of the hydrodynamic brake is designated with 11 and the housing of the stator 4 with 42. The baffle 2, 20 is angularly designed and projects radially inward with an annular leg 21 and separates, in the outer area, both toroidal chambers 41, 31 of the stator 4 and of the rotor 3. In the position of the baffle 2, 20 according to FIG. 1, the second cylindrical leg 22, extending in an axial direction, abuts against a radially inner wall 52 of the chamber 5, said chamber 5 being formed by the housing of the stator 42 and the housing of the hydrodynamic brake 11. The lower cross section in FIG. 1 shows the bent leg 27 of the driver 25 of the cylindrical leg 22 which engages the driver device in annular recess 64 of the piston 61. The reinforcement 26 on the driver 25 is also shown. FIG. 3 is identical with FIG. 1 except that the actuation device has been outwardly pressed up to the stop 70 via the pressure in the pressure chamber 63 and the pistons 61 moved against the spring tension of the springs 62. The driver device 64 of the piston 61 has thus adjusted the driver 25 on the baffle 22 in the radially outward position in which the peripheral space correspondingly enlarges and the baffle 2, 20 no longer projects in the common toroidal chamber 41, 31 of the stator and rotor 4, 3. As shown in FIG. 4, the leg 22 of the baffle 20 abuts against a radially outer wall 51 of the chamber 5. The slits 23 are open to a maximum in said expanded position of the baffle and the slits 28 when in the radially inward position of the baffle are almost closed (FIG. 1). The shape of the slits depends on the peripheral difference between the radially inward and the radially outward positions of the baffle and on the number of slits distributed about the periphery. The device for reducing idle losses operates as follows: During operation of the brake (FIGS. 3 and 4), in which the toroidal chambers 31 of the rotor and 41 of the stator are filled with oil, pressurized fluid is conveyed via the duct 69 into the pressure chamber 63 and the pistons 61 are moved outwardly up to the locking screws 66 against the pressure of the springs 62 so that the stops 70 of the pistons 61 abuts against the locking screws. The drivers 25 are carried along by the baffle 2, 20 via the driver device 64, and the baffle expands so that the front edge 29 of the radially inward projecting annular leg 21 of the baffle 20 is located behind the common toroidal chambers 41, 31 of the stator and rotor 4, 3.

The axially extending cylindrical leg 22 of the baffle 20 abuts on the radially outer wall 51 of the chamber 5 limiting the expanding movement. If the toroidal chambers 31, 41 of the rotor and stator are vented (FIG. 1 and 2), no pressure acts via the duct 69 so that both pistons 61 are inwardly moved via the springs 62. The drivers 25 are likewise moved inwardly via the driver device 64 so that, as shown in FIG. the peripheral space 24 is almost closed. In this position, the baffle projects into the common toroidal chambers 31, 41 of the rotor and stator 3 and 4 and the air circulation between rotor 3 and stator 4 is interrupted in the outer area of the toroidal chambers. The idle loses are thus reduced within the hydrodynamic brake. Depending upon the width of the annular leg, which extends radially inwardly between the toroidal chambers, the reduction of the idle losses can be arranged differently.

The invention is not limited to the embodiment shown in FIGS. 1 to 5. Accordingly, several baffles, for instance, can be distributed about the periphery and the baffles can be radially actuated by several actuation devices. As shown, the actuation devices can be actuated by pressurized fluid but also by variations of temperature between the hydrodynamic brake during brake operation and in the evacuated operation. The baffles can have any cross-sectional shape if only one leg projects in the active position between the two toroidal chambers.

Figure 5:
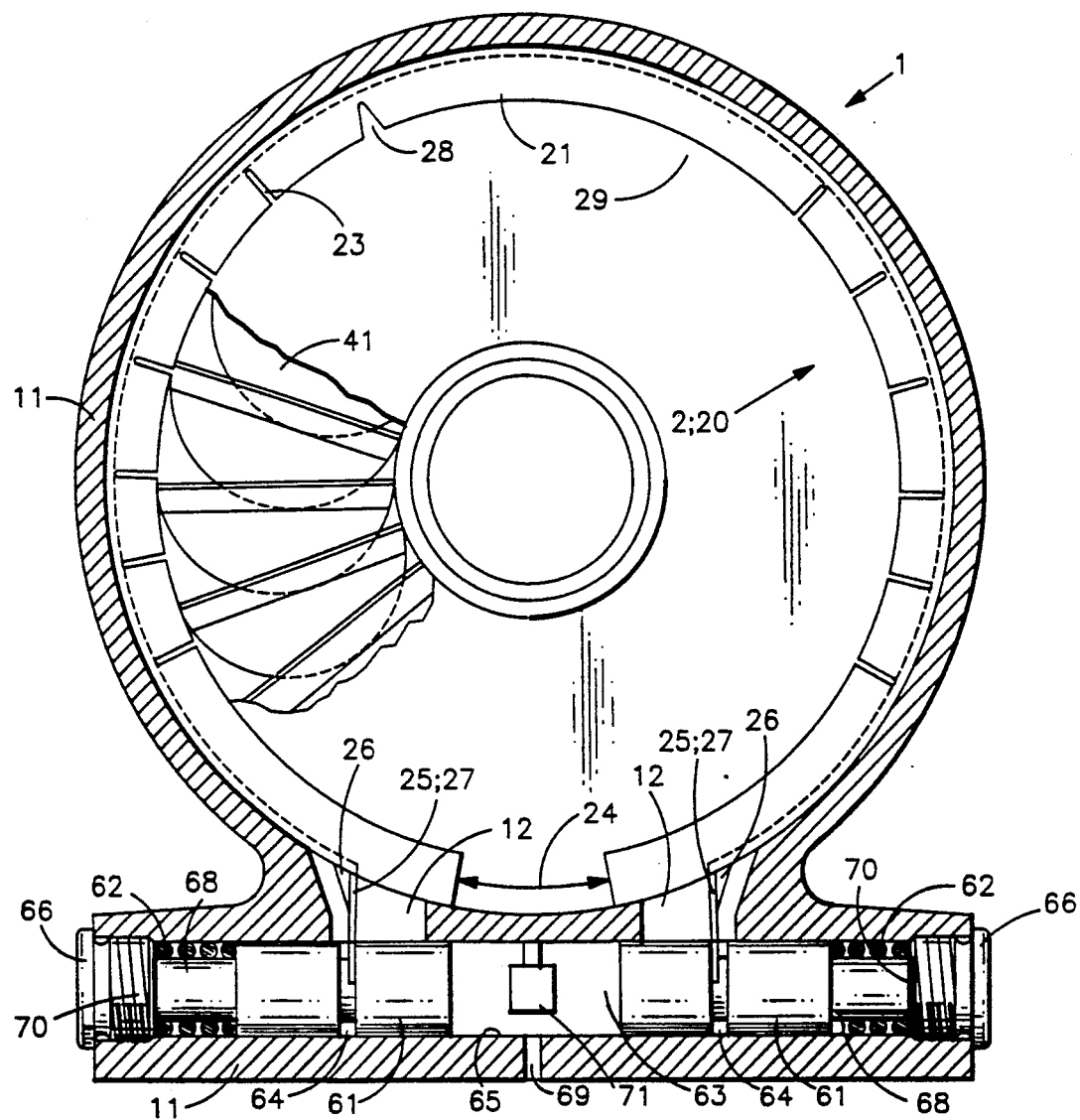
FIG. 5 shows a section according to FIG. 1 of a further embodiment with the sunken baffle in the braking position.

The annular space 63 between both pistons 61 can also be formed by an annular stop 71 in the center of the bore 65 (FIG. 5).

We claim:

1. A hydrodynamic brake (1) including a movable baffle system (2, 20, 21, 22, 25, 27), for reducing ventilation losses between rotor and stator toroidal chambers (31, 41) of said hydrodynamic brake (1) during idle operation of said brake when oil has been evacuated from said brake (1), said baffle system including at least one annular shaped baffle (2, 20) movable between an extended position proximate an inner periphery of a common chamber between said rotor and said stator toroidal chambers (31, 41), in said extended position, said annular shaped baffle (2, 20) radially reducing said common toroidal chamber between said rotor and stator toroidal chambers (31, 41) thereby reducing ventilation losses between said rotor and stator toroidal chambers (31, 41), and during braking operation wherein said hydrodynamic brake (1) is filled with oil, said at least one annular shaped baffle movable to a retracted position proximate an outer periphery of said rotor and stator toroidal chambers (31, 41), said movable baffle system characterized in that said at least one annular baffle (2, 20) is of angular cross-section and includes an annular leg (21) coupled perpendicular to an axially extending cylindrical leg (22) of said at least one annular baffle (2, 20), said annular leg (21) projecting inwardly into said common toroidal chamber between said rotor and stator toroidal chambers (31, 41) and said perpendicular axially extending cylindrical leg (22) abutting radially inwardly from a wall (51, 52) when said at least one annular baffle (2, 20) is disposed in said extended position during said idle operation, an wherein said annular leg (21) is disposed proximate said outer periphery of said rotor and stator toroidal chambers (31, 41) and wherein said cylindrical leg (22) abuts radially outwardly against said wall (51, 52), said annular leg (21) and said cylindrical leg (22) disposed radially outside said rotor and stator toroidal chambers (31, 41) when said at least one annular baffle (2, 20) is disposed in said retracted position during said braking operation; and wherein said movable baffle system includes at least one actuation device, for selectively effectuating movement of said at least one annular baffle (2, 20) between said extended position during idle operation and said retracted position during braking operation.

2. A hydrodynamic brake according to claim 1, characterized in that said annular shaped baffle (2) includes one annular shaped baffle disposed about the entire inner periphery of said common toroidal chamber region between said toroidal chambers, said one annular shaped baffle including first and second ends, for allowing differences in diameter of said one annular shaped baffle when said one annular shaped baffle moves between said extended and retracted positions and wherein said one annular shaped baffle (2, 20) includes elasticity between the extended and retracted positions of said baffle (20) and the differences of diameter associated with said extended and retracted positions provided by a plurality of slits (23, 28) distributed over an inwardly facing periphery of said inwardly facing periphery of said inwardly projecting annular leg (21) of said baffle (20).

3. A hydrodynamic brake according to claim 2, characterized in that said plurality of slits (23, 28), in said inward projecting annular leg (21) of said baffle (20) are designed so as to be generally entirely closed in the extended position of said baffle so that said inwardly projecting annular leg (21) situated between said rotor and stator toroidal chambers (31, 41) has no opening proximate said first and second ends of said annular baffle.

4. A hydrodynamic brake according to claim 3, wherein said actuation device includes a piston-cylinder unit (60).

5. A hydrodynamic brake according to claim 4, characterized in that a housing (65, 11) of said piston-cylinder unit (60) is connected with the housing (11) of said hydrodynamic brake (1).

6. A hydrodynamic brake according to claim 5, characterized in that said piston-cylinder unit (60) includes two pistons (61) biased toward a central region of said piston cylinder housing (65) by means of spring tension applied by first and second springs (62);

wherein an annular shaped pressure chamber (63) is disposed between said two pistons (61);

each of said two pistons (61) having a driver device (64); and wherein first and second drivers (25) proximate said first and second ends of said annular shaped baffle and forming said one space region (24) are provided, and wherein said first and second drivers (25) engage with said driver device (64) of each piston (61) of said cylinder-piston unit (60).

7. A hydrodynamic brake according to claim 6, characterized in that said first and second drivers (25) are formed by a bent leg (27) in said cylindrical leg (22) of said annular baffle (20); and wherein said bent leg (27) is stabilized in a defined position via a reinforcement (26).

8. A hydrodynamic brake according to claim characterized in that said piston-cylinder unit (60) has a foot-like housing (11) in which is provided a bore (65);

said bore (65) is outwardly closed via two locking screws (66);

wherein in an inner area of said bore are disposed said two pistons (61) forming an annular pressure chamber (63) between said two pistons (61) in said central region of said bore;

said driver device (64) in each respective piston (61) including an annular recess (64);

wherein between said two locking screws (66) and each of said two pistons (61), each provided with a long protrusion (68), a respective one of said first and second compression springs (62) is situated, which biases both pistons (61) into the central region of said bore proximate each other when said annular chamber (63) is not filled with pressurized fluid; and in said housing (11) between a respective chamber (5) and said bore (65) of said piston-cylinder unit (60), a respective aperture (12) is provided for each driver (25) of said one annular shaped baffle (20) and said apertures (12) are closed by said pistons (61) both when said two pistons (61) are biased into the central region by said first and second springs (62) and when said two pistons (61) are urged in an outer position by an actuation pressure in said pressure chamber (63).

9. A hydrodynamic brake according to claim 8, characterized in that when said pistons (61) are urged into said central region via said springs (62), via the driver device (64) and via the first and second drivers (25) on said baffle (20), each of said first and second drivers (25) abuts along with said cylindrical leg (22) on an inwardly situated wall (52) of said respective chamber (5) and in said position, the radially inward projecting annular leg (21) of said baffle (20) separates said toroidal chambers (31, 41) and in the manner of a partition, reduces in diameter said common toroidal chamber (31, 41).

10. A hydrodynamic brake according to claim 8, characterized in that in the outer position of said two pistons (61) attained via the pressure in said pressure chamber (63), via said driver device (64) of said pistons and via said first and second drivers (25) of said baffle (20), each of said first and second drivers (25) abuts along with said cylindrical leg (22) on an outwardly situated wall (51) of said respective chamber (5) and in said position the radially inwardly projecting annular leg (21) of said baffle (20) is located behind said common toroidal chambers (31, 41).

11. A hydrodynamic brake (1) including a movable baffle system (2, 20, 21, 22, 25, 27), for reducing ventilation losses between rotor and stator toroidal chambers (31, 41) of said hydrodynamic brake (1) during idle operation of said brake when oil has been evacuated from said brake (1), said baffle system including one annular shaped baffle (2, 20) disposed about an entire inner periphery of a common toroidal movable between an extended position proximate said inner periphery of said common chamber between said rotor and said stator toroidal chambers (31, 41), in said extended position, said annular shaped baffle (2, 20) radially reducing said common toroidal chamber between said rotor and stator toroidal chambers (31, 41) thereby reducing ventilation losses between said rotor and stator toroidal chambers (31, 41), and during braking operation wherein said hydrodynamic brake (1) is filled with oil, said at least one annular shaped baffle movable to a retracted position proximate an outer periphery of said rotor and stator toroidal chambers (31, 41), said movable baffle system characterized in that said at least one annular baffle (2, 20) is of angular cross-section and includes an annular leg (21) coupled perpendicular to an axially extending cylindrical leg (22) of said at least one annular baffle (2, 20), said annular leg (21) projecting inwardly into said common toroidal chamber between said rotor and stator toroidal chambers (31, 41) and said perpendicular axially extending cylindrical leg (22) abutting radially inwardly from a wall (51, 52) when said at least one baffle (2, 20) is disposed in said extended position during said idle operation, an wherein said annular leg (21) is disposed proximate said outer periphery of said rotor and stator toroidal chambers (31, 41) and wherein said cylindrical leg (22) abuts radially outwardly against said wall (51, 52), said annular leg (21) and said cylindrical leg (22) disposed radially outside said rotor and stator toroidal chambers (31, 41) when said at least one annular baffle (2, 20) is disposed in said retracted position during said braking operation;

said one annular baffle including means for providing elasticity in said one annular baffle for allowing said annular baffle to move between said extended and retracted positions, said means for providing elasticity including one space region between first and second ends of said one annular baffle, for allowing differences in diameter of said annular baffle when said one annular baffle moves between said extended and retracted positions, said means further including a plurality of slits extending radially only partially through said one annular baffle and distributed over an inwardly projecting periphery of said inwardly projecting annular leg (21) of said one annular baffle (2, 20); and wherein said movable baffle system includes at least one actuation device, for selectively effectuating movement of said least one baffle (2, 20) between said extended position during idle operation and said retracted position during braking operation.

\* \* \* \* \*